(12) United States Patent
O'Toole, Jr.

(10) Patent No.: US 7,761,501 B1
(45) Date of Patent: Jul. 20, 2010

(54) METHODS AND APPARATUS FOR PROVIDING DATA DISTRIBUTION THAT SUPPORTS AUDITING

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 2007 days.

(21) Appl. No.: 10/279,437

(22) Filed: Oct. 24, 2002

(51) Int. Cl.
*G06F 15/16* (2006.01)
(52) U.S. Cl. ........................ 709/203; 709/223; 709/228; 713/168; 715/513
(58) Field of Classification Search ................ 709/223, 709/224, 238, 203; 707/9, 10; 713/201, 713/168; 715/513; 380/247
See application file for complete search history.

(56) References Cited

U.S. PATENT DOCUMENTS

| | | | | |
|---|---|---|---|---|
| 6,105,027 | A * | 8/2000 | Schneider et al. ............... | 707/9 |
| 6,408,336 | B1 * | 6/2002 | Schneider et al. ........... | 709/229 |
| 6,605,120 | B1 * | 8/2003 | Fields et al. ................ | 715/239 |
| 6,850,252 | B1 * | 2/2005 | Hoffberg ..................... | 715/716 |
| 6,873,617 | B1 * | 3/2005 | Karras ......................... | 370/389 |
| 6,922,663 | B1 * | 7/2005 | Maurer ......................... | 703/13 |
| 7,103,772 | B2 * | 9/2006 | Jorgensen et al. ........... | 713/168 |
| 7,143,290 | B1 * | 11/2006 | Ginter et al. ................ | 713/176 |
| 2003/0135612 | A1 * | 7/2003 | Huntington et al. ......... | 709/224 |
| 2003/0178487 | A1 * | 9/2003 | Rogers ........................ | 235/454 |

\* cited by examiner

*Primary Examiner*—Khanh Dinh
(74) *Attorney, Agent, or Firm*—Patterson & Sheridan, LLP

(57) ABSTRACT

The invention is directed to techniques for providing data distribution that supports auditing. Accordingly, a data communications device receives data from a data provider, the data containing label information. The data communications device filters the data based on the label information contained in the data. Next, the data communications device associates token information with the data whereby the token information enables later audits of transmission of the data traveling through the data communications device. Finally, the data communications device transmits the data and the token information toward a data receiver. Filtering of the data results in certain data being removed and/or directed to a specific data receiver based on labels within the data. The data communications device also inserts a signature into the token in order to identify the data communications device transmitting the data in a manner that cannot be forged.

32 Claims, 9 Drawing Sheets

126

| TOKEN | LABEL INFO. | DATA COMM. DEVICE | CONTRACT |
|---|---|---|---|
| 123 | L1 D.P. | 2 | XYZ |
| 456 | L2 NEWS | 2 | XYZ |
| 789 | L3 TEXT | 2 | XYZ |
| 234 | L4 VIDEO | 2 | XYZ |
| 272 | L5 IMAGE | 2 | |

FIG. 6

METHODS AND APPARATUS FOR PROVIDING DATA DISTRIBUTION THAT SUPPORTS AUDITING

BACKGROUND OF THE INVENTION

The Internet is a carrier for many forms of media content. The Internet operates in conjunction with many providers who contribute to the Internet infrastructure. These providers include Internet service providers (ISP's) and other owners of network facilities, publishers and other content providers and distributors and re-distributors of content, each playing a role in the dissemination of media content.

Publishers produce digital content and distributors distribute the digital content for audience (e.g., users, viewers, readers, listeners, etc.) consumption using various different reimbursement or payment models for the distributed content. One such model is to charge recipients of digital media based on a contract that is charged according to a flat rate for distribution of a broad range of content and types of content. For example, cable television viewers are charged monthly for access to all of the programming available on a designated station or group of stations during a month time period. In some situations, Internet service providers charge a monthly fee for unlimited access to content during a month time period. Internet content providers distribute content using variety of other reimbursement models, such as charging by the title, by a specified access time such as a number of access hours during a month or yearly time period or by a one time charge.

In some situations, publishers receive payment for media usage in the form of money. At other times, publishers provide content in exchange for advertising exposure (or some other media exchange) in which the distributor displays publisher-provided advertising to users. In that case, for example, a publisher provides a distributor with video programming. The programming includes embedded advertising that the distributor distributes to users along with the video programming. In turn, by displaying the embedded advertising to users, the distributor covers the publisher's fee for the media provided to the distributor by the publisher.

At times, the distribution path of media content is such that the media content is distributed by one distributor to other distributors or to more than one other distributor before the media content ultimately reaches its audience. In this situation, the original publisher or other intermediate distributors of the media content may actually charge the down-line intermediate distributors for the media content being re-distributed.

Another method of handling content distribution over a network is for a publisher to code the provided content with digital rights information in order to limit user access to the content, based on predefined agreements between the publisher and users. In one example of the use of digital rights management techniques, a publisher sends digital rights information in the form of a digital rights management specification language (e.g., such as ODRL, XRML, etc.) to a user, along with media content such as video content. The digital rights information may designate, for example, that a specified user who provides a designated password, for a pre-defined number of viewing times, only authorizes the video content for display and that the distributor is not authorized to copy the video to another recipient user host. Upon receipt by the user, software configured to display the video content can also limit usage of the content accordingly.

There are various conventional coding techniques for providing identification of media content. Extensible Mark-Up Language (XML) is a text labeling language that can be applied to individual elements of documents or other media content in order to label the individual elements of the content so that they can be more easily identified, typed, analyzed, processed and/or interpreted, etc. The XML language provides a series of statements including tags and content labels that can be used to identify and characterize elements of the content. XML can format various types of content such as text and files, for example, with audio and images.

Other techniques exist to provide unique identification of media content that may be distributed over a network. For example, transmission devices can attach digital signatures to an electronically transmitted message in order to uniquely identify the sender of the document. The purpose of a digital signature is to authenticate that the entity sending the message is really the entity that claims to have sent the message. Digital signatures employ the use of encryption techniques that are applied to the sent and received messages in order to guarantee the unforgeability of the signature.

SUMMARY OF THE INVENTION

Unfortunately, there are shortcomings to the conventional methods of publishing and distributing media content to users. In particular, a conventional reimbursement or charging mechanisms based on usage time or based on fixed fees limit a publisher's options for providing content to an audience and/or users. For example, there would be a sales and marketing advantage to being able to charge for content usage based on some metric that more closely approximates actual user receipt and/or usage than is possible using current fixed fee based charging mechanisms. Conventional fix fee based charging results in different users experiencing different per unit costs depending upon the amount of usage time of the user. For example, fixed fee charging options may result in certain content being under-priced or over-priced due to the fact that different content may have different costs of production. Media distributors and (re-distributor) have a joint interest in offering various kinds of content at variable price levels.

However, the conventional methods available to publishers and distributors for pricing and charging for distributed content on a variable price level basis are costly. One such conventional method requires publishers to operate software systems or other mechanisms in conjunction with the publishers content servers to individually keep track of and charge for the content provided as the content is sent to individual users/audience members. According to this method, publishers send content to specific, already-identified users based on prior agreement between the publisher and individual users defining the extent of media content usage granted to the user. This method requires individual user authentication to ensure that the proper access to media content is made available to the authorized users. As a result of the processing of the connection with individual users that is required, publishers using this method incur the high cost which results from the requirement of establishing and processing the distribution of media content with users on an individual basis. In addition, this model may result in duplicate transmission of the same content to multiple recipients.

Conventional digital rights management techniques provide an alternative for charging users to provide media content. Using such digital rights management techniques, publishers transmit usage parameters within the content to an end-user computer. The parameters define the usage rights for specific media content sent by the publishers. Conventional software on the user-side computer system exerts control over usage of the content based upon the usage parameters sent to the specific users. However, systems based on this concept are generally complex and threatening to publishers and distributors. In particular, the conventional digital rights management techniques address end user content usage but do not address the distributors' and/or re-distributors' function of providing efficient alterations, substitutions, and/or rearrangements of content for re-distribution nor do they address payment mechanisms that may exist between distributors and content publishers based on contracts between these entities.

Finally, to the extent that distributors redistribute using techniques other than the techniques mentioned above, publishers selling media content to distributors or re-distributors are limited in the conventional techniques available for auditing and/or verifying the amount of content distributed by the distributors and/or re-distributors to an audience (e.g., users). Because distributors themselves control conventional equipment that performs the content distribution, publisher tracking of content distribution is difficult and/or impossible. This circumstance leaves the door open to potential abuse.

Embodiments of the invention are directed to methods and techniques for effectively auditing the distribution of publisher data (e.g., media content and other data) filtered and forwarded to end users. In one embodiment of the invention, a data communications device (e.g., a router, switch, hub, gateway, bridge, forwarding device, server, etc.) receives the data (e.g., media content) from a data provider (e.g., a publisher of media content). The data contains labeling information. In one embodiment, the labeling information, and the data are formatted using the extensible mark-up language (XML). Other embodiments of the invention may employ different forms of labeling or formatting. A token and label processor, operating within the data communications device, filters (e.g., removes) selected data elements from the data, based on the labels in the data, before forwarding the data to one or more data receivers (e.g., user systems) by matching the labels in the data elements to labels from a set of filter criteria. Alternatively or in addition to filtering content, the data communications device may filter data by selectively transmitting the data to specific data receivers, based on the labels contained in the data. In one embodiment of the invention, the data communications device performs a combination of filtering and transmitting data to specific data receivers.

In addition to filtering transmitted data to designated data receivers, the data communications device inserts token information into the data before transmitting the data to the data receiver. The token information can include a unique identifier, such as a random number or other unique identifier. In one embodiment, the data communications device inserts a signature (e.g., a digital signature) into the token information. The data communications device operator (e.g., a distributor, as the data communications device operator will also be referred to herein) uses a data distribution log or other mechanism that receives and holds, among other things, token information, in order to generate auditing/billing/charging/payment information. The billing/charging/payment information, which the distributor provides to a publisher for reimbursement purposes, lists data and associated token information that the distributor has sent to data receivers (e.g., users or viewers). The data provider (e.g., publisher of data such as media content) can track data actually received by a data receiver (user/viewer) based on inserted token information. This is accomplished, for example, by using a tracking mechanism placed between the data communications device and the data receiver to track the flow of data to the data receiver based on inserted tokens, or by using a mechanism operating on the data receiver such as software program which tracks data received based on inserted tokens. The data provider can audit the billing/charging/payment list provided by the data communications device operator by comparing the billing/charging/payment information including an identity of inserted tokens from the data distribution log to the actual data containing inserted tokens received by the data receiver (i.e., which the data provider has tracked).

Mores specifically, one embodiment of the invention provides a method for providing data distribution that supports auditing. In this embodiment, a data communications device receives data from a data provider and the data contains label information. The data communications device filters the data based on the label information contained in the data and associates (e.g., inserts) token information with the data. The token information enables auditing capability of transmission of the data through the data communications device. Finally, the data communications device transmits the data and the token information toward a data receiver.

Accordingly, the data communications device can filter data received for either removal of selected data elements and/or to direct the data to specific data receivers or other operations. In addition, the data communications device associates token information (e.g., such as by insertion) into the data for later use in auditing of billing/charging/payment lists or logs provided by the data communications device operator (i.e., a distributor of the data) to the data receiver.

For example, distributors may receive compensation from the publisher for each instance of advertising distributed to a user (e.g., or members of an audience), and as a consequence the distributors may use the invention to maintain and provide the publisher with a list of all of such advertisements which the distributor claims to have distributed to users for which the distributor seeks payment. Embodiments of the invention thus provide a method and mechanism by which the publisher can audit such a payment list that the publisher receives from the distributor.

In one embodiment, the data communications device retrieves a set of filter criteria associated with the data communications device, detects a label of the set of filter criteria within the label information contained in the data and performs a filter operation on a data element associated with the label to modify the data. In one embodiment of the invention, the step of performing a filter operation comprises the steps of removing, from the data, a data element defined by the detected label.

The set of filter criteria provides the data communications device with label information that can be matched to the label information stored within the data received from the data provider for filtering purposes. Embodiments of the invention thus provide a method and mechanism for filtering data elements from a stream of data en route to users or an audience.

In one example, data (e.g., media content) provided by a publisher for distribution, includes high quality video content destined for customers who have purchased a premium subscription, and lower quality video or images for the regular subscription customers. In this example, the media content furthermore includes news reporting (with the aforementioned video and/or images) along with text information. All of the data (e.g., the content) is provided in an extensible mark-up language (XML) format which includes labels of the individual data elements to designate or differentiate the high and low quality video and news portions of the content. Upon receipt of data, the data communications device may, for example, filter out low quality video and images from data before sending it to some customers who have contracted to receive the premium subscription service. In addition, the data communications device may filter out high quality video from the data before sending it to customers who have contracted to receive the regular subscription service. This embodiment thus filters content.

In another embodiment of the invention, the data communications device retrieves a set of filter criteria associated with the data communications device, detects a label of the set of filter criteria within the label information contained in the data and performs a filter operation on a data to cause the step of transmitting to transmit the data toward a data receiver defined for the label in the set of filter criteria. The filter criteria, in one example, may be a list of users designated to receive certain types of content based on their contract with the distributor. For example, one user may have contracted to receive data such as news programming from a certain geographic region such as North America, but another user may have contracted to receive worldwide news content. Upon receipt of the data with news content labeled as being news from South America, the data communications device can direct the data elements with the South American content to the user who has contracted to receive the worldwide news but not to the customer who has contracted for North American news. This embodiment thus filters a destination for content.

In another embodiment, in response to receiving data from the data provider, the data communications device creates a token of the token information. The token is associated with a data element in the data. The data communications device also obtains a data descriptor from label information for the data element within the data. The data descriptor describes content of the data element. Then the data communications device associates the data descriptor with the token in a data distribution log of the data communications device.

The token provides a way to identify an individual component of data transmitted by the data communications device to a data receiver. Data descriptors provide a way to interpret the nature of the content within individual data elements of data. In turn, the data descriptors serve as a basis, for example, for filtering selected data elements from the data and/or for transmitting elements of data toward a data receiver defined for the label. By storing these together in a data distribution log in a data communications device, embodiments of the invention provide a log that, supports auditing of which data communications devices provide which content to which recipients.

In yet another embodiment, the data descriptor is a financial descriptor identifying a contractual metric that relates a charge to be determined for the token associated with the data descriptor. In one such embodiment, the data descriptor label represents a contract under which the particular labeled data element is provided for distribution. Such a financial descriptor provides an alternative mechanism for determining the nature or rate of reimbursement for a particular data element or portion thereof.

In another embodiment, the data communications device, to create the token, generates an identifier for the token. The identifier includes at least one of a random identifier, an identity of the data communications device and an identity of the data element to which the token will be associated. Then the data communications device assigns the identifier to the token.

Tokens provide a mechanism for uniquely identifying a particular data element. At some time after creation and insertion of the token into data, the operator of the data communications device (i.e., the distributor) can provide a list of billing/charges/payment information representing data that the data communications device has sent to a data receiver. The list includes the tokens.

In one embodiment, the data communications device inserts the token into the data element at a location defined by a token insertion label. Designating a specific location for the token simplifies processing of the tokens during auditing.

In yet another embodiment, the data includes a plurality of data elements. Each data element is delineated in the data with label information. The data communications device repeats the steps of creating a token of the token information, obtaining the data descriptor, associating the data descriptor with the token in a data distribution log of the data communications device and inserting the token into the data element, for each data element in the data that includes a token insertion label, such that each data element containing the token insertion label identifies the token within the data element. This repetitive process provides for the filtering and token insertion of a series of data elements in a stream of data by a data provider (e.g., a publisher or other provider of data).

In one embodiment, the data communications device receives data and transmits the data (i.e., in the steps of receiving and transmitting) using a predefined packet size, and the filtering and associating operations do not change the size of the data. The data communications device can also recalculate connection information including a check sum. In other words, embodiments of the invention provide methods and mechanisms for filtering and tokenizing data at high speed within the network transport level of transmission, in order to handle such processing in real time (i.e., as opposed to delaying processing). In one instance, the embodiment of the invention maintains a pre-defined packet size of the packet transporting data. Accordingly, the data communications device must only recalculate a check sum prior to transmitting the received data to the data receiver.

In another embodiment, the data includes token insertion filler information and the data communications device inserts the token into the data element. The data communications device replaces a portion of token insertion filler information with the token information such that the total predetermined size of the combination of the token and the token insertion filler information remains constant. By maintaining constant packet size in this manner, the data communications device is able to maintain network transport level of transmission of data.

In another embodiment, the data communications device, in the steps of filtering and associating, modifies the data to be a different size than the data received. The data communications device then adjusts connection information associated with transmission of a data to account for changes in size of the data. In this situation, in which the size of packets transporting data have been changed, the data communications device modifies connection information of the packets prior to transmitting the data to the data receiver. This process also allows for high speed and/or real time processing of data in connection with the filtering and tokenizing processes.

In another embodiment, the data communications device creates a signature for the data communications device and associates the signature for the data communications device with the token information. The signature for the data communications device provides a means for token validation. The data communications device then forwards the signature for the data communications device with the data and token information. The signature (e.g., a digital signature) provides a mechanism to ensure that the signature and associated data, when received by the data receiver, was in fact, transmitted by the data communications device. The signature provides an unforgeable identification of the data communications device.

In yet another embodiment of the invention, the label information is arranged in a hierarchical manner having a number of different label levels. The data communications device filters the data based on label information contained in the data at a predetermined number of label levels in hierarchy of labeling information. By limiting the hierarchical levels of labels to a predetermined number of levels, the data communications device is able to maintain processing of data at a fast enough and/or real time speed (i.e., wire speed) in connection with the filtering and tokenizing processes.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device, comprises one or more communications interfaces (e.g., network interfaces), a memory (e.g., any type of computer readable medium, storage or memory system), a processor and an interconnection mechanism connecting the communications interface, the processor and the memory. In such embodiments, the memory system is encoded with a token and label processing application that when performed on the processor, produces a token and label processing process that causes the computer system to perform any and/or all of the method embodiments, steps and operations explained herein as embodiments of the invention. In other words, a computer, switch, router or other device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured to operate as explained herein is considered an embodiment of the invention. More particularly, a computer program product is disclosed which has a computer-readable medium including computer program logic encoded thereon that, when executed on at least one processor with a data communication device, causes the processor to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other device to cause such a device to perform the techniques explained herein as embodiments of the invention.

Embodiments of the invention also include computer program products such as disks, or other readable media that have a computer-readable medium including computer program logic encoded thereon for providing data distribution that supports auditing, such that the computer program logic, when executed on at least one processing unit with the computerized device, causes the at least one processing unit to perform any or all of the aforementioned methods.

The methods embodiments of the invention may be implemented by computer software and/or hardware mechanisms within a data communications device apparatus. It is to be understood that the system of the invention can be embodied strictly as a software program, as software and hardware, or as hardware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 depicts a data distribution log that stores token and label information according to one embodiment of the invention.

DETAILED DESCRIPTION

Embodiments of the invention are directed to methods and techniques for effectively supporting auditing of distribution of data to end users. In one embodiment of the invention, a data communications device operates a token and label processor to receive the data (e.g., media content), which contains labeling information, from a data provider (e.g., a publisher). The data communications device, based on the labels in the data, either filters selected data elements of the data from the stream of data and/or forwards the data to one or more specified data receivers. The data communications device can thus perform a combination of filtering and transmitting data to specific data receivers based on existing labeling information in the data.

In addition, the token and label processor of the data communications device inserts token information into the data before transmitting (but after filtering) the data to the data receiver. The token information can include a unique identifier, such as a random number or other unique identifier. In one embodiment, the data communications device inserts a signature (e.g., a digital signature) into the token information. The data communications device creates a data distribution log or other mechanism that holds, among other things, token information to generate billing/charging/payment information that lists data sent to the data receivers (e.g., users or viewers) along with associated token information. A data provider (e.g., publisher of data such as media content) can audit data actually received by a data receiver (user/viewer), for example with a tracking mechanism placed between the data communications device and the data receiver, or by use of a tracking mechanism operating on the data receiver such as a software program that tracks data received based on inserted tokens contained in the data. By comparing the billing/charging/payment information which include tokens, obtained from the data communications device token data distribution log, to the actual data received by the data receiver which the data provider has tracked based on actual tokens received, the data provider is able to audit the billing/charging/payment list generated by the data communications device operator.

Figure 1:
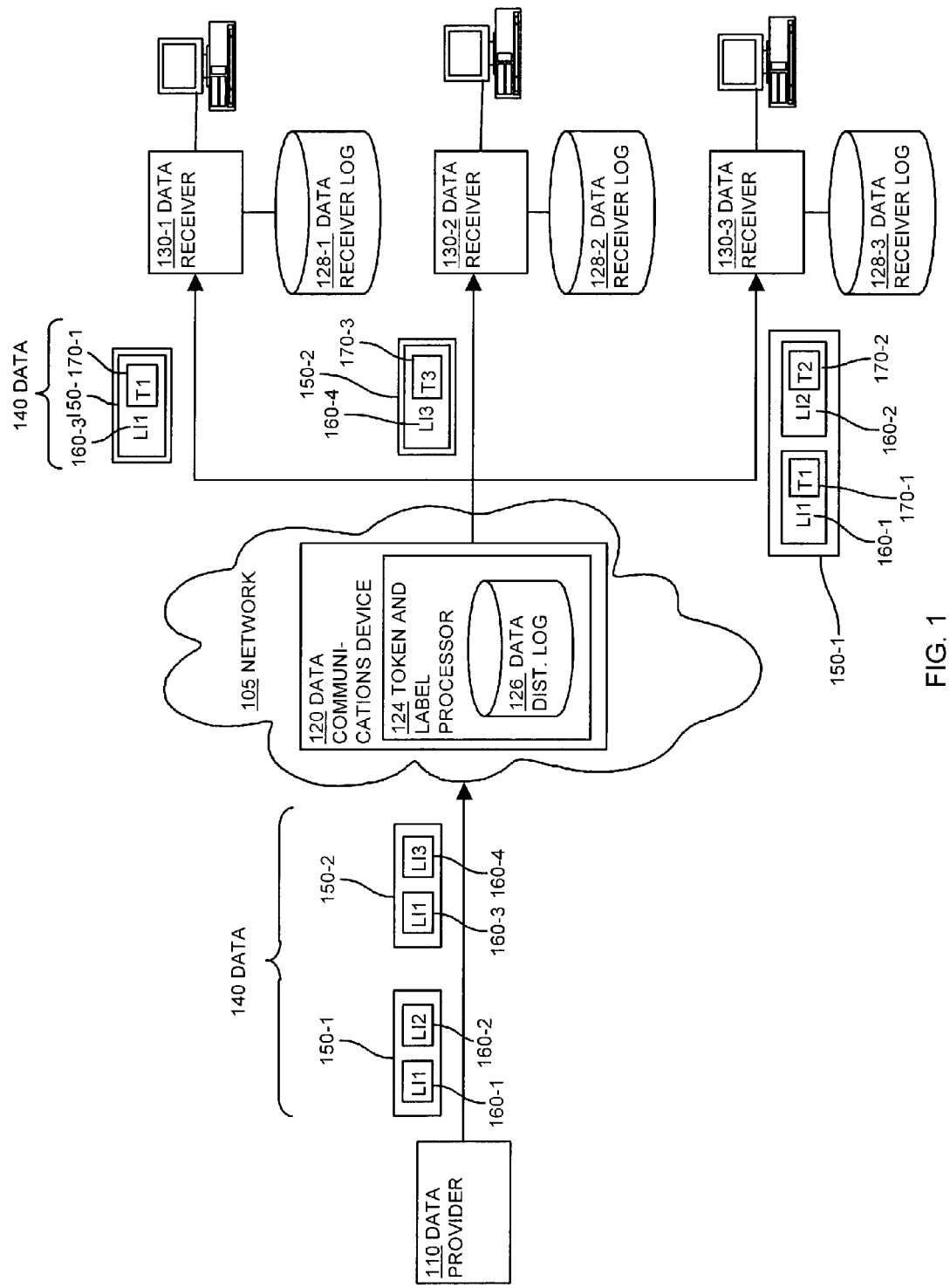
FIG. 1 is an example system for providing data distribution that supports auditing according to one embodiment of the invention.

FIG. 1 is an example system 100 for providing data distribution that supports auditing according to one embodiment of the invention. FIG. 1 includes a data provider 110, a network 105 comprising at least one data communications device 120 and multiple data receivers 130-1 to 130-3 (e.g., a representative number of user systems). The data communications device 120 contains a token and label processor 124 and a data distribution log 126. Multiple data receivers 130 are shown attached to a data receiver log 126-1 to 126-3 (e.g. a representative number of data receiver logs). In addition, FIG. 1 shows data 140 (e.g., publishers content en route to the data communications device 120) comprising, in this example, two data portions 150-1, 150-2. Data portion 150-1 contains label information (LI) LI1 160-1, LI2 160-2. Data portion 150-2 contains label information LI1 160-3 and LI3 160-4. FIG. 1 also shows data 140 that has been transmitted from the data communications device 120 and is now en route to one or more of the multiple data receivers 130. Specifically, the data portion 150-1 is en route to data receiver 130-1 and includes label information LI1 160-3 and token information T1 170-1. The data portion 150-2 is en route to the data receiver 130-2 having label information LI3 and token information T3; and the data portion 150-1 that is en route to data receiver 130-3 includes label information LI1 and token information T1 and also label information LI2 and token information T2.

The system 100 provides methods and mechanisms for processing label information 160 and token information 170 at a sufficient speed such that the label information 160 can be used to filter data 140 and such that tokens 170 may be inserted in the data 140 for the purpose of conducting a later audit of data 140 transmitted by the data communications device 120. The auditing process comprises comparing information from a data distribution log 126 (e.g., containing token information) provided by the operator of the data communications device 120 (i.e., a distributor) to one or more data receiver logs 128 that track data 140 containing tokens actually received by the data receivers 130.

FIG. 1 demonstrates an example of the flow of filtered of data 140 and the insertion of token information 170 into data portions 150. This processing will be described in connection with the following flow charts explaining the procedures for such processing.

Figure 2:
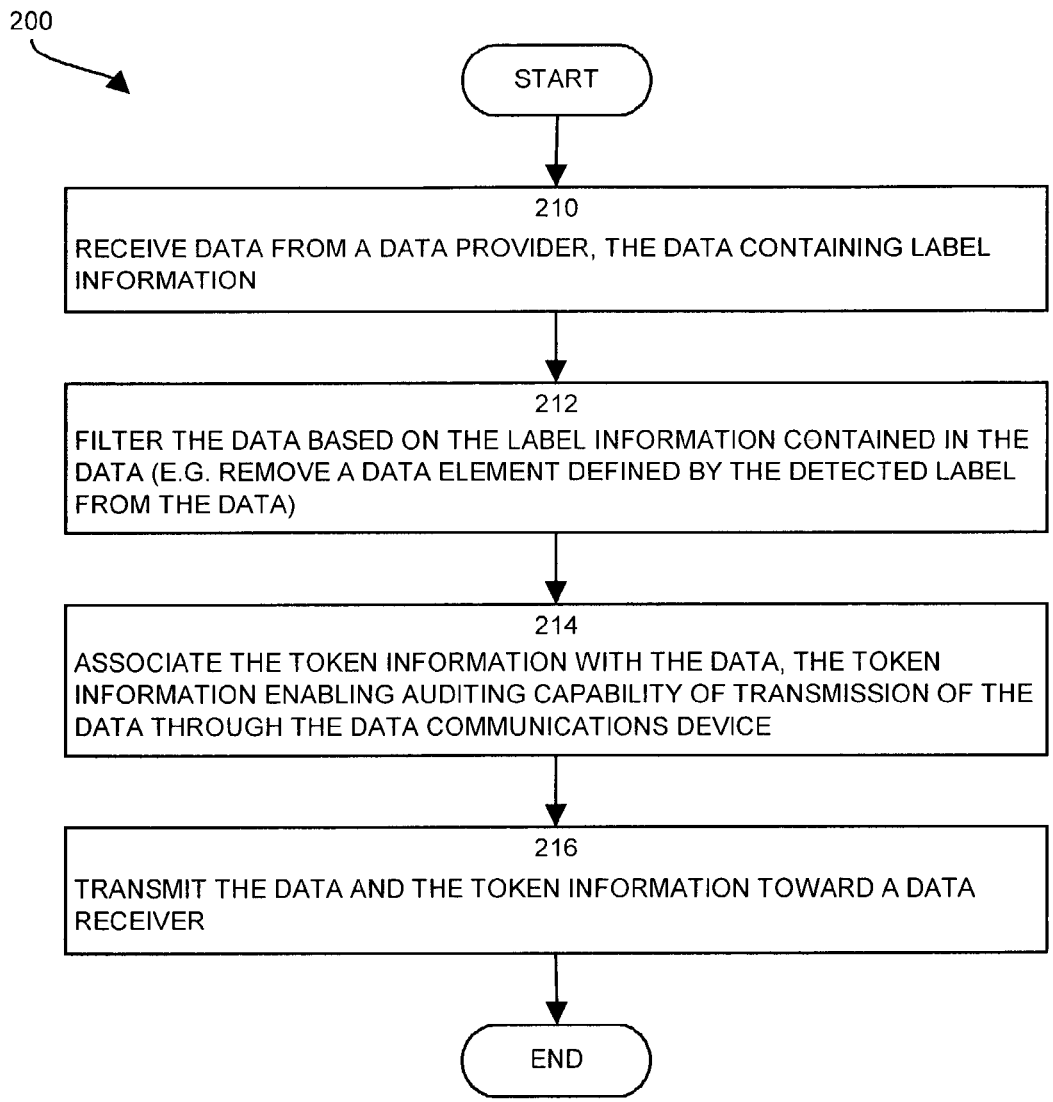
FIG. 2 is as flow chart of a procedure for providing data distribution that supports auditing according to one embodiment of the invention.

FIG. 2 is as flow chart of a procedure for providing data distribution that supports auditing according to one embodiment of the invention.

In step 210, the data communications device 120 receives data 140 (e.g., one or more data portions 150) from a data provider 110. The data 140 contains label information 160. As an example, assume that the data provider 110 is a publisher of digital (e.g., Internet) radio programming such as news, weather, sports and music. The data communications device 120 receives data 140 (e.g., news, weather, sports, music, etc. programming content) sent by the data provider 110 over a network 105 ultimately destined for the data receivers 130 (e.g., user(s) or audience). The data communications device 120 is a device under the control of a distributor of such data 140.

At the data structure level, each data portion 150 is encoded within a computer readable media comprising an encoding of information including label information 160-n defining some content (not specifically shown in FIG. 1).

In step 212, the data communications device 120 filters the data 140 based on the label information 160 contained in the data portions 130. In one example, the label information 160 is extended mark-up language (XML) coding embedded within each data portion 150. The label information 160 identifies content such as news, music, video, etc. or in the alternative the label information 160 can identify other characteristics of the data portion 150. When the data communications device 120 receives a data portion 150, the data communications device 120 uses the label information 160 to filter and determine how the data communications device 120 will handle each different data element (See FIG. 5, 142-n) defined by the label information 160 as each data portion 150 passes through the data communications device 120. For example, in one embodiment, the data communications device 120 removes a data element (See FIG. 5, 142-n) defined by detected label 160-n from the data portion 150.

Different examples of filtering data 140 that the data communications device 120 has received from the data provider 110 are demonstrated pictorially in FIG. 1. In one of the examples, the data provider 110 transmits the data portion 150-1 containing label information LI1 160-1 and label information LI2 160-2 to the data communications device 120. In the other example, the data provider 110 transmits the data portion 150-2 containing label information LI1 160-3 and label information LI3 160-4 (in addition to content) to the data communications device 120.

As a result of the data communications device 120 filtering the label information 160, the data communications device 120 processes the data portions 150-n in specific ways. That is, the data communications device 120 identifies the label information 160 and makes a determination of specific actions to undertake, such as removing certain content related to specific label information 160 from a data portion 150 and/or transmitting content associated with specific label information 160-n to a specific data receiver 130).

For example, the data communications device 120 sends one data element 150-1 associated with the data portion 150-1 to a specific data receiver 130-1 after first removing (i.e., filtering) label information LI2 (and the data associated with label information LI2). The data communications device 120 can also send the data portion 150-1 to a different data receiver 130-3 with both label information LI1 and label information LI2 (i.e., without filtering its content but instead filters as that data portions destination).

FIG. 1 also demonstrates how the data communications device 120 can filter the other data portion 150-2 to a data receiver 130-2 with label information LI3 (having first removed or filtered label information LI3 160-4 associated with the label information 160-4.

In one embodiment, the token information 170, inserted into the data portion 150, includes a unique identifier such as a random number that is inserted into the data 140 for later use in auditing transmission of the data 140. The data provider 110 validates the unique identifier in the token 170 during the process of later comparing the data distribution log 126 and any of the data receiver logs 128.

Alternative compositions of the token information 170 include a number taken sequentially from a counter, a timestamp/timer number, or a combination of any of those. Other alternative compositions of the token information 170 include a securely computed one-way hash value using the aforementioned numeric value that is either a unique or non-unique numeric value as well as other device-identifier or distributor-identifier numbers. In yet other alternative compositions, any one or more of a number of known cryptographic hashing or message-authentication methods are used to construct token information 170 values of various desired levels of security. In some cases, the type, quality or security level required for token information 170 is specified by contractual arrangement between the publisher and the re-distributor. In one case also, the token information 170 type, quality or security level required is associated, in the contract, with the content type and the label information 160. In step 214, the data communications device 120 associates the token information 170 with the data 140. The token information 170 enables auditing capability of transmission of the data 140 through the data communications device 120.

The token and label processor 124, within the data communications device, 120 maintains a data distribution log 126 of the token information 170. The distributor (i.e., operating the data communications device 120) of the data 140, uses information generated as a result of transmission of the data 140 and stores token information 170 in the data distribution log 126, to later generate a list of billing/charging/payment information for data 140 transmitted to the data receivers 130 (e.g., users). The generated billing/charging/payment list is later matched with information from data receiver logs 128 in order to audit the distributor.

In step 216, the data communications device 120 transmits the data 140 and the token information 170 toward the data receiver 130-n. The data receiver (e.g., user) views, listens to or uses received data 140 in the normal fashion. However, in addition to providing the data 140, with the user's cooperation the data provider can later compare the token information 170, actually received in the data portions 150, to billing/charging/payment information in the log 126.

In order to audit the billing/charging/payment information (e.g., maintained on the data distribution log 126), the data provider 110 tracks the data 140 actually received by users either by monitoring the actual data 140 received by the user or users (e.g., with user cooperation, such as for example, with software installed on a user computer system to monitor data received) or by some tracking device that tracks token information 170 in actual data portions 150 sent by the distributor en-route from the data communications device 120 to the user.

For example, the data provider 110 may arrange to track data 140 traveling over a network link (e.g., at a router, ISP, etc.) between the data communications device 120 and the user 130 by monitoring tokens 170 appearing in data receiver logs 128.

Figure 3:
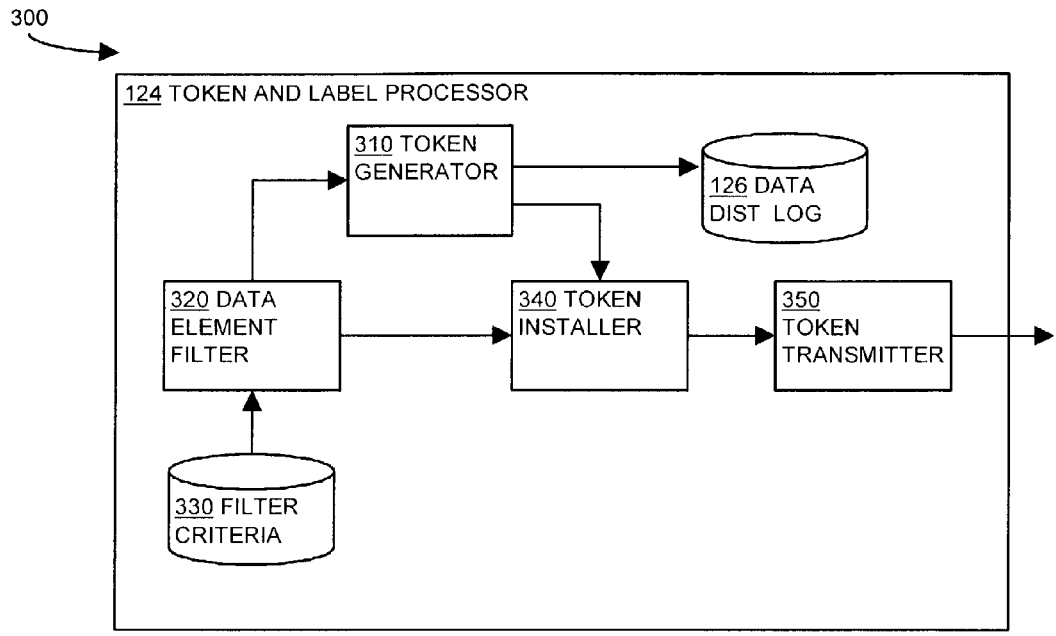
FIG. 3 is a diagram of the token and label processor according to one embodiment of the invention.

FIG. 3 is a diagram of the token and label processor 124 configured according to one embodiment of the invention. The token and label processor 124 includes a token generator 310, a data element filter 320, a token installer 340, a data distribution log 126 and a token transmitter 350. The data element filter 320 operates in conjunction with the filter criteria 330 to filter data portions 150 from the data stream 140. The token generator 310 generates token information 170 that the token generator 310 stores in the data distribution log 126 for later use in conducting audit comparisons. The token generator 310 also provides tokens to the token installer 340 that installs the tokens 170 into data portions 150. The token installer 340 installs tokens in the data 140 prior to transmission of the data portions 150 by the token transmitter 350 from the data communications device 120. These components collectively perform the functions of the data communications device 120 as explained herein.

Figure 4:
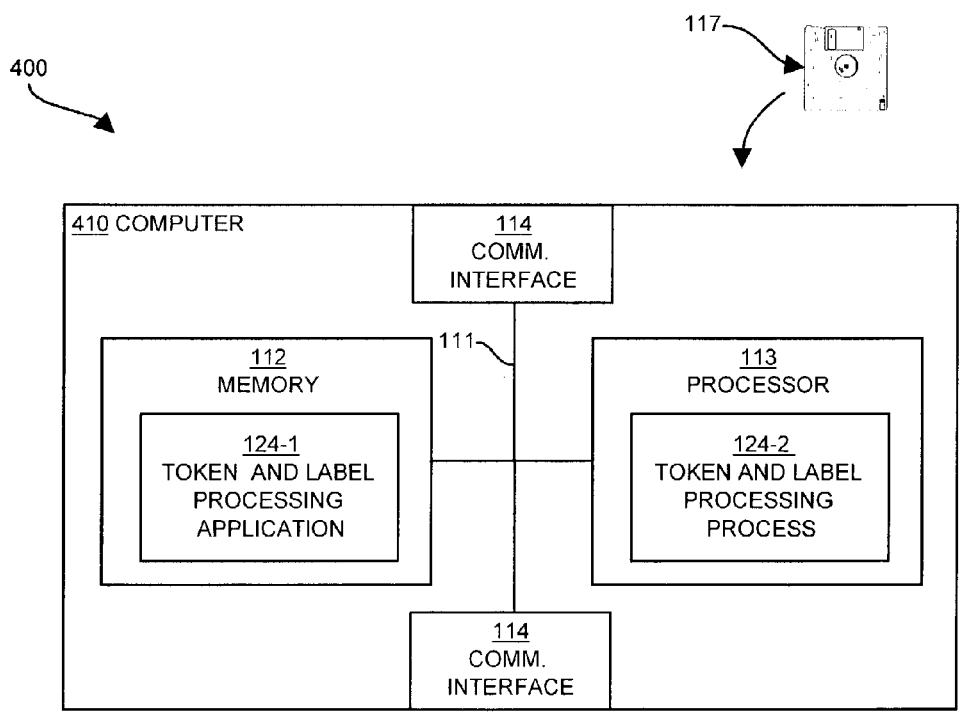
FIG. 4 depicts an example embodiment of the invention implemented using a general purpose computer to perform the functions of data distribution that support auditing according to one embodiment of the invention.

FIG. 4 depicts an example embodiment of the invention implemented using a general purpose computer 410 to perform the functions of data distribution that supports auditing according to one embodiment of the invention.

The example computer system 410 includes an interconnection mechanism 111 (e.g., a data bus and/or circuitry) which couples a memory 112 (e.g., any computer readable medium such as random access memory (RAM) and/or read only memory (ROM) or even a disk or storage medium) having a token and label processing application 124-1, a processor 113 (e.g., a microprocessor or central processing unit) having a token and label processing process, and a communications interface 114 (e.g., modem or other network interface). The communications interface 114 allows the computer system 410 to communicate with the data provider 110 and data receivers 130 and other data communications 120 via the network 105.

The memory 112 is encoded with logic instructions and/or data that form a token and label processing application 124-1 configured according to the embodiments of the invention which operates as a token and label processing process 124-2 in the processor 113 (e.g., when executed).

Figure 5:
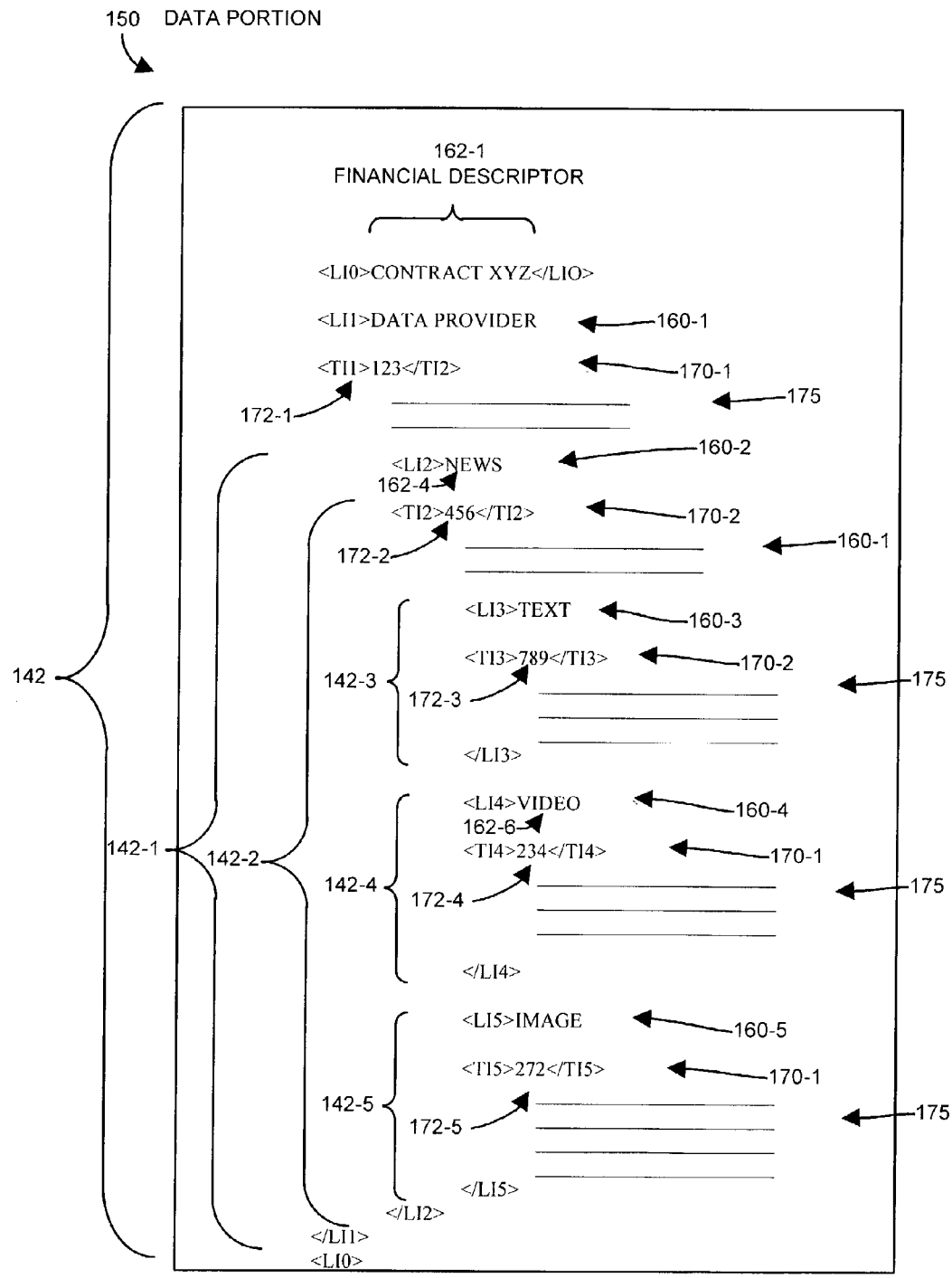
FIG. 5 depicts a stream of data formatted in a fashion similar to the XML language according to one embodiment of the invention.

FIG. 5 depicts a detailed example of one data portion 150 formatted in a fashion similar to the XML language according to one embodiment of the invention.

FIG. 5 depicts individual examples of label information 160 including, in this example, data provider label information 160-1, news label information 160-2, text label information 160-3, video label information 160-4 and image label information 160-5 content. Also depicted is a financial descriptor 162-1. FIG. 5 shows five examples of token information 170-1 to 170-5 stored in the token insertion labels 172-1 to 5. FIG. 5 also shows individual data elements 142 defined or delineated by respective label information 160-1 to 160-5, which serves as identifiers for the data elements 142-1 to 142-5. FIG. 5 also illustrates examples of tags 162-4 and 162-6 for news and video label information 160-2 and 160-4, respectively. Also illustrated are examples of content 175 for each data element 142.

FIG. 5 demonstrates one example embodiment in which content 175 is labeled using label information 160 to define a plurality of data elements. FIG. 5 also provides a demonstration of hierarchical nesting of content 175 within multiple levels of label information 160.

FIG. 6 depicts a data distribution log 126 that stores token 170 and label information 160 according to one embodiment of the invention. In the example embodiment, token information 170, label information 160, data communications device 120 identifiers, and financial descriptor 162 (e.g., contract) information are stored in a table in the data distribution log 126. The information in the table provides token information 170 needed by an operator of the data communications device 120 (e.g., the distributor) to generate billing/charging/payment information that can be provided to a data provider 110 (e.g., a publisher). The data provider 110 compares the list of actual data 140 received (as recorded in one or more data receiver logs 128) to the data distribution log 126 information in order to determine if any items have been mis-billed/charged.

Figure 7:
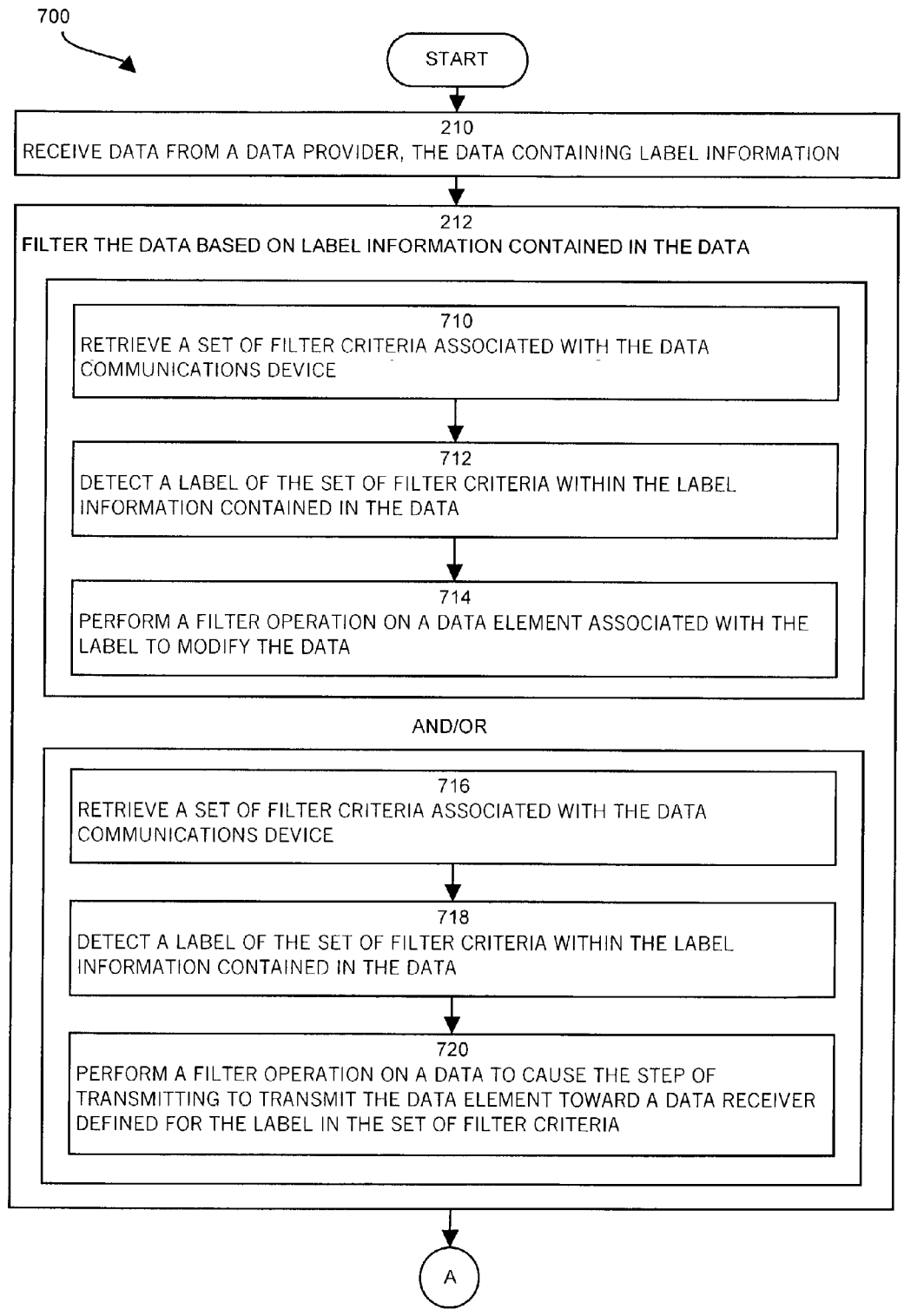
FIG. 7 is a flow chart of a procedure showing additional details for receiving and filtering data according to one embodiment of the invention.

FIG. 7 is a flow chart showing additional details of a procedure for receiving and filtering data according to one embodiment of the invention.

In step 210, the data communications device receives data from a data provider 110 (as described with respect to step 210 in FIG. 2). In step 202, the data communications device filters the data based on label information 160 contained in the data 120 (as described with respect to step 212). Specifically, in step 710, the data communications device 120 retrieves a set of filter criteria 330 associated with the data communications device 120. The filter criteria 330 identify characteristics of the data 120 that the data communications device 120 has been designated to process in a particular way. For example, in one embodiment of the invention, the filter criteria 330 specifies certain data 140, for instance, such as high quality video media, that is designated to be filtered out of the data stream.

In step 712, the data communications device 120 detects a label 160 of the set of filter criteria 330 within the label information 160 contained in the data 140 (i.e. in a data portion 150). In other words, as data portion 150 passes through the data communications device 120, the data communications device 120 identifies data 120 that matches labels 160 from the data communications device's 120 set of filter criteria 330. In one example embodiment, the label information 160 and filter criteria 330 represent specific types of content such as video or text. In another example embodiment, the label information 160 and filter criteria 330 represent other content characteristics such as the quality level of certain types of content (i.e., high or low quality video). In yet another example, the label information 160 and filter criteria 330 pertains to the billable cost or other economic/payment/contractual characteristics of the data 140 as designated by the data provider 110 (e.g. publisher). In another alternative, the label information 160 and filter criteria 330 represent the billable cost or other economic/payment/contractual characteristics of the content with respect to an upstream distributor, to be charged to or paid by the downstream distributor. One reason to filter based on such characteristics, for example, is the desire of a distributor or Internet service provider (ISP) to control the costs incurred by delivering data 140 to subscribers or end-users who have fixed-fee or fee-capped contracts.

In step 714, the data communications device 120 performs a filter operation on a data element 142 associated with the label 160 (detected in step 712) in order to modify the data 120. For example, in one embodiment, the data communications device 120 is configured to remove all video content for which the labels 160 of the data portions 142 match the appropriate labels 160 of the set of filter criteria 330 from a stream of data 140 before forwarding the remainder of the stream of data 140 to a particular data receiver 130.

As demonstrated in FIG. 1, assume that the data element 150-2 contains text content 175 labeled by label LI1 160-3 thus forming data element 142-3 and video content labeled by label LI3 160-4 thus forwarding element 142-4. As the data 140 passes through the data communications device 120, the token and label processor 124 identifies that label LI4 160-4 "video" is the same as a label in the set of filter criteria 330. Consequently, the token and label processor 124 filters the video content (i.e., the video content data element 142-4 labeled by label LI4) from the data 140 so that the data 140 arriving at the data receiver 130-2 is limited to data elements 142-3 delineated with labels LI3 150-2 representing the text content. This is just an example of content filtering and more or less content 175 could be filtered depending on the filter criteria 330.

Steps 716, 718 and 720 describe an alternative to the detailed procedure for content filtering the data described in steps 710, 712 and 714. In the alternative procedure, steps 716 (i.e., retrieve a set of filter criteria associated with the data communications device) and 718 (i.e., detect a label of the set of filter criteria within the label information contained in the data) operate in the same fashion as steps 710 and 712 respectively.

In step 720, the data communications device 120 performs a destination filter operation on a data portion 150-*n* cause the step of transmitting to transmit the data portion 150-*n* toward a data receiver 130 defined for the label 160-*n* in the set of filter criteria 330. In other words, in this alternative procedure, filtering the data 140 amounts to transmitting data portions 150-*n* to a selected data receiver 130 which are chosen based on the matching of label information in the data portions 150-*n* to the filter criteria 330.

In other words, in one embodiment, the data communications device 120 is configured to transmit the data portions 150 whose labels match labels 160 of the set of filter criteria 330 to the appropriate data receiver 130. The data receiver(s) 130-*n* to which the data communications device 120 is configured to send the data portions 150-*n* is selected based on the label matching to the set of filter criteria 330.

As demonstrated in FIG. 1, assume for example, that the data portions 150-1 contains label LI1 160-1 and label LI2 160-2. As the data portion 150-1 passes through the data communications device 120, the token and label processor 124 identifies that label LI2 160-2 has a label that is the same as a label defined in the set of filter criteria 330 and that indicates that data receiver 130-3 us to receive data 140 containing such labels. Consequently, the token and label processor 124 transmits the data element 150-1 to the appropriate data receiver 130-3 for the data element 150-1 identified with the label in the filter criteria 330.

It should be understood that procedures outlined by steps 710 to 714 and by steps 716 to 720 are not necessarily mutually exclusive. In other words, the procedures of steps 710 to 714 and steps 716 to 720 can both operate on the same data portion 150-*n*. Accordingly, in one example, the data communications device both 120 filters out certain data 140 from a data portion 150-*n* and transmits the same data portion 150-*n* to a specific receiver 130-*n* based on a matching of the label 160-*n* of the data portion 150-*n* to the filter criteria 330.

Figure 8:
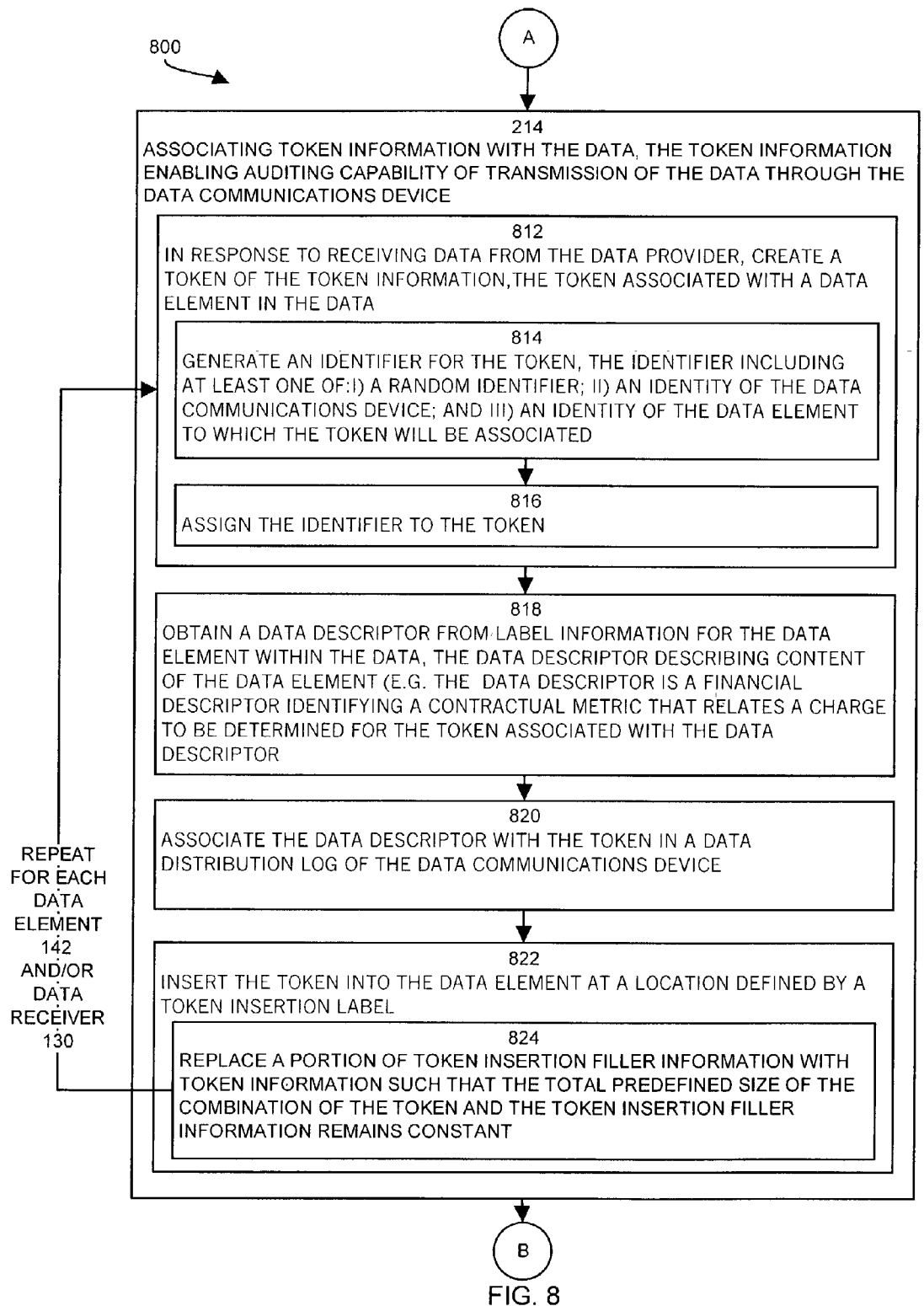
FIG. 8 is a flow chart of a procedure showing additional details for associating token information according to one embodiment of the invention.

FIG. 8 is a flow chart of a procedure showing additional details for associating token information 170 to data portions 150 according to one embodiment of the invention.

In step 214, the data communications device 120 associates token information 170 with the data 140, as described earlier. As will be explained below, steps 812 through 824 illustrate techniques according to example embodiments of the invention for carrying out the processing of step 214.

In step 812, in response to receiving data 140 from the data provider 130, the data communications device 120 creates a token 170-*n* of (i.e., for) the token information 170. The token 170-*n* created is associated with a data element 142 in the data element 150. A token 170-*n* uniquely identifies data elements 142 that pass through the data communications device 120 en route to one or more of the data receivers 130.

In step 814, the data communications device 120 generates an identifier for the token 170-*n*. The identifier includes at least one of a random identifier, an identity of the data communications device and an identity of the data element to which the token will be associated. The identifier uniquely identifies one or more data elements 142 in a data portion 150, that a data receiver 130 receives. The data elements 120 (e.g., with tokens 170) can be later compared to the billing/charging/payment information provided by the data communications device 120 operator in order to audit the billing/charging/payment information.

In step 816, the data communications device assigns the identifier to the token. This identifier can thus be used to determine, for example, where the token originated (i.e., within which device in a network) after the token is received and stored or otherwise detected at a data receiver device (e.g., a client computer system).

In step 818, the data communications device 120 obtains a data descriptor 162 (i.e., a specific one of the labels 160 for a data element 142) from label information 160 for the data element 150-$n$ within the data 140. The data descriptor 162 describes content of the data element 142 to which the token will be associated. In one example embodiment, the data descriptor 162 is a financial descriptor identifying a contractual metric (e.g. a contract number) that relates a charge to be determined for the token 170-$n$ associated with the data descriptor 162. The data descriptor label can, for example, represent a contract under which the particular labeled data element 142 is provided for distribution. The financial descriptor can provide an alternative mechanism for determining the nature or rate of reimbursement for distribution of a particular data element 142.

In step 820, the data communications device 120 associates the data descriptor 162 with the token 170-$n$ in a data distribution log 126 maintained by the data communications device 120. The data communications device 120 saves token information 170 to the data distribution log 126 and inserts token information 170 into data elements 150-$n$ for transmission to the data receiver 130.

In step 822, the data communications device 120 inserts the token 170-$n$ into the data element 150 at a location defined by a token insertion label (See FIG. 5, 172).

In step 824, the data communications device 120, in one embodiment, replaces a portion of token insertion filler information with token information 170 such that the total predefined size of the combination of the token 170 and the token insertion filler information remains constant. By maintaining constant packet size in this manner, the data communications device 120 is able to maintain data transmission with minimal modifications to packets, thereby minimizing packet processing time.

In addition to performing steps 812 through 824, as described above, the data communications device 120 repeats the steps (i.e. 812 to 824) as many times as are necessary to process all of the data elements 142 in a portion of data 150. In this manner, this repetitive processing adds tokens 170 into each data element 142 within, for example, a document data portion 150 containing many data elements 142. This results in the data portion 150 containing tokens inserted at all token locations that were not filtered out of the data portion 150 during the filtering process previously explained.

In an alternative embodiment, the processing of steps 812 through 824 may also be performed for each different data receiver 130 that is to receive the data portion 150. As an example, if a data portion is an XML document containing five data elements 142, each containing a token insertion label 172 (i.e., places at which tokens may be inserted), and this data portion 150 is to be sent (i.e., routed) through a data communications device 120 along three different routes (i.e., separate data links), then the tokens inserted into each of the three separate data portions 150 that will travel along the three different routes can each be differentiated for example by selecting a unique identifier (in step 814). In this manner, even though the same data portion 150 took three different routes to arrive at three different downstream devices 120 (or end-user data recipients 130), the tokens in each of these data portions 150 (that contain essentially the same content) will be different from each other. This might be useful, for example, to identify how many different distribution of the same content took place to end user devices.

These steps are performed in such a fashion that the data communications device 120 can conduct the steps without delaying data 120 transmission. In order to maintain sufficiently fast processing speed for associating data descriptors 162 to tokens 170 as well as for processing other label information 160 (e.g., label 160 containing data descriptors 162) the method used preferably operates in such a way as to allow sufficiently fast processing of tokens 170, labels 160 and data portions 150 by the data communications device 120. Such control of processing speed is partially achieved by arranging label information 160 in a hierarchical manner having a number of different label levels. The data communications device 120 can filter the data 140 based on label information 160 contained in the data 140 at a predetermined number of label levels in a hierarchy of labeling information.

For example, in the case of data encoded in an XML format, as depicted in FIG. 5, certain data elements 142 relate to certain labels 160-3, 160-4, 160-5 and are embedded within other data elements 142 (e.g., related to labels 160-2). In turn, the aforementioned data elements are embedded within a main data element 142-1 (e.g., related to label information 160-1). By limiting the levels of data elements 142 embedded within other data elements to a predetermined number of embedded 142, such as, in this example, 3 levels, the required processing speed of the data communications device can be maintained.

Other alternative embodiments of the invention also provide a method whereby the communications device 120 is able to maintain data transmission with minimal modifications to packets, thereby minimizing packet processing time.

In one such embodiment of the invention, data 140 is receiving and transmitted using a predefined packet size where the steps of filtering and associating do not change the size of the data 140 and the step of transmitting the data comprises the step of recalculating connection information (i.e., of the packets transporting the data 120) including a check sum.

In another embodiment of the invention, the data communications device 120, in the steps of filtering and associating, modifies the data 120 to be a different size than the data 120 received in the step of receiving. This embodiment further comprises the step of adjusting connection information such as TCP/IP sequence and acknowledgment information associated with transmission of data 120 to account for changes in size of the data 120 (e.g. addition of tokens and/or removal of data elements 142). In both embodiments of the invention, the data communications device 120 maintains network transport level of transmission of data 120 allowing for sufficiently fast processing of the data 120.

Figure 9:
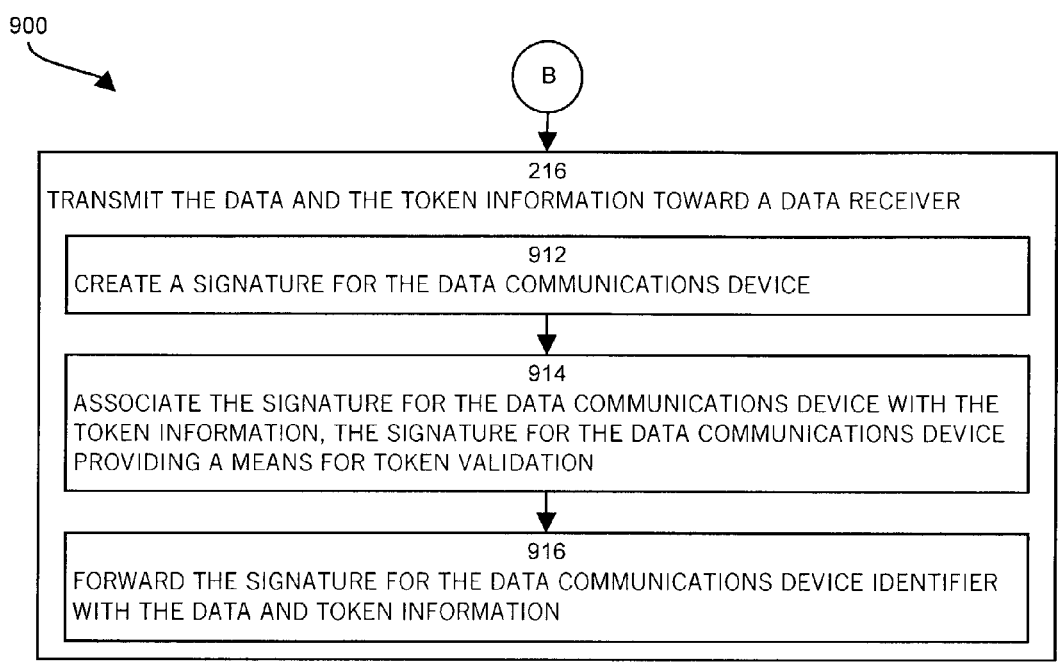
FIG. 9 is a flow chart showing additional details of a procedure for transmitting the data according to one embodiment of the invention.

FIG. 9 is a flow chart showing additional details of the procedure for transmitting the data according to one embodiment of the invention.

In step 216, the data communications device 120 transmits the data portion 150 and the token information 170 toward a data receiver 130, as described earlier. Steps 912 through 914 explain details of data portion transmission.

In step 912, the data communications device 120 creates a signature for the data communications device 120. The digital signature provides an unforgeable identification of the data communications device 120 through which the data portion 150 has traveled that becomes part of the token information 170. Upon later receipt of the token information 170 containing the signature, the data receiver 130 verifies that the signature is a valid indication of the data communications device 120 represented by the signature.

In certain cases, the data portions 150 and associated token information 170 travel through more than one data communications device 120 en route to the destination data receiver 130. In that situation, multiple signatures representing multiple data communications device's 120 through which the data portions 150 and tokens 170 have traveled, are created, as described with respect to the data structure in step 210.

In step 914, the data communications device 120 associates the signature for the data communications device 120 with the token information 170. The signature for the data communications device 120 provides a means for token 170-*n* validation. In one embodiment, the data communications device 120 inserts the signature (e.g., a digital signature) into the token information 170.

In step 916, the data communications device 120 forwards the signature for the data communications device 120 identifier along with the data portion 150 and token information 170.

Figure 10:
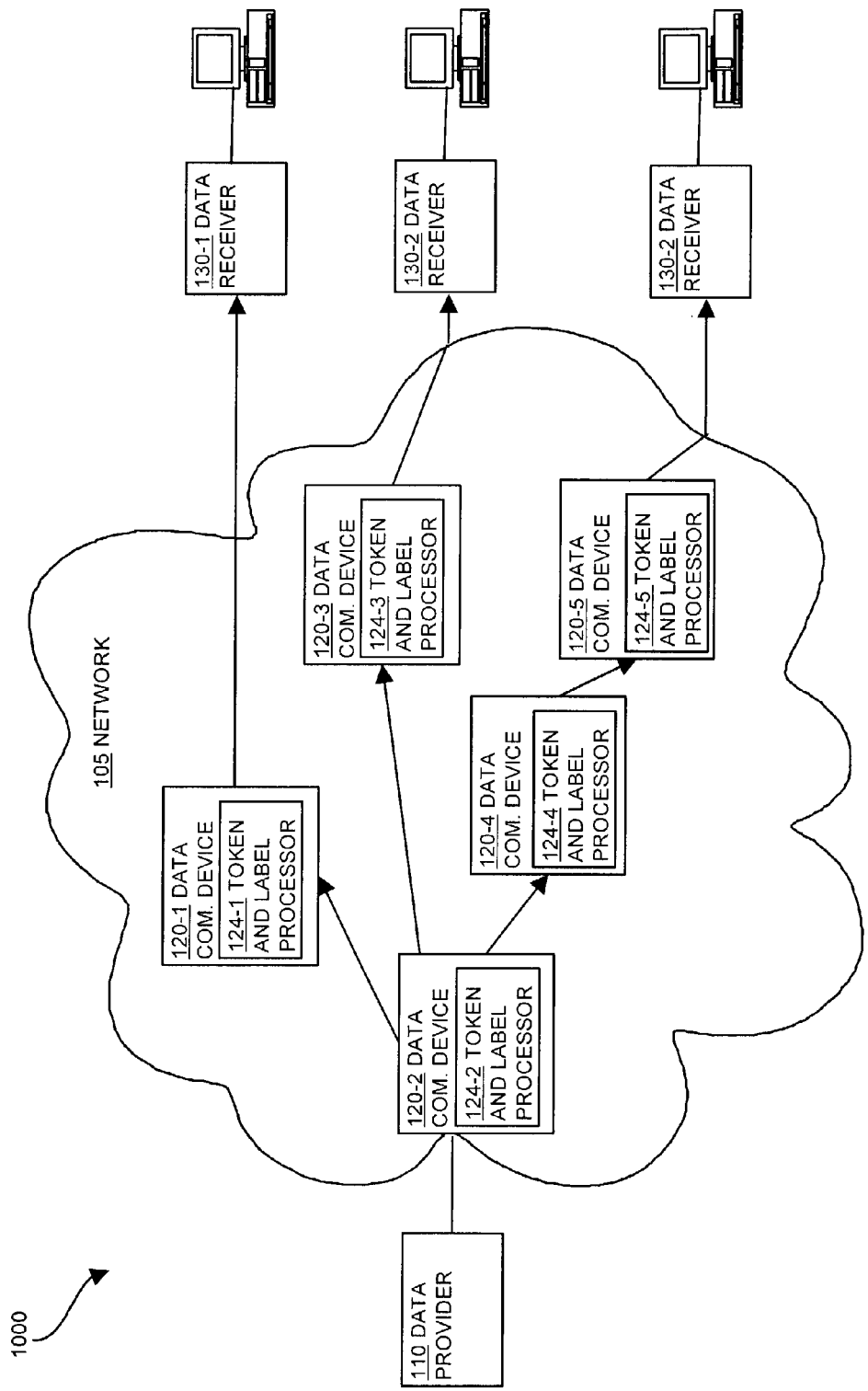
FIG. 10 depicts a network in which multiple data communications devices distribute data according to one embodiment of the invention.

FIG. 10 depicts a network in which multiple data communications devices distribute data according to one embodiment of the invention. FIG. 10 shows a data provider 110, network 105 and multiple data receivers 130 in a similar fashion to the system 100 for providing data distribution that supports auditing as depicted in FIG. 1. In addition, FIG. 10 shows multiple connected data communications devices 120-1 to 120-5 each having a token and label processor 124 within the network 105. As demonstrated in FIG. 10, multiple data communications device's can process data 140 en route to the data receivers 130-2, according to one embodiment of the invention. In one case, for example, three data communications device's 120-2, 120-4, 120-5 transmit data 120 between the data provider 110 and data receiver 130-2.

The features of the invention may be employed in data communications device and other computerized devices such as those manufactured by Cisco systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, data communications devices can be routers, bridges, switches, access servers, gateways, hubs, concentrators, proxy servers, repeaters and so forth which exchange data over an interconnection of data links. These may be physical connections or may also be provided using wireless communication mechanisms. On the low end they may also be as simple as wire connections between two devices. The network allows data to propagate between various applications that execute on the hosts.

Various physical or hardware data communications connection mechanisms allow devices to interconnect with the network 105. Physical data communications connection mechanisms can include modems, transceivers, network interface cards, fiber optic cards, ports and other hardware devices and many others which allow data to be transferred at various data transfer rates (i.e., bandwidth) to and from the host and between data communications devices. For example, certain devices or hosts may have high speed network interfaces which provide connections to the network at high data rate such as fractional-T1, T1, E1 or higher. Other devices or hosts may use an inexpensive modem that provides a maximum data transfer rate of 56.6 kilobits per second (Kbps), more or less, to and from the network.

Also, in alternative embodiments of the invention, the data communications device 120 inserts tokens 170 and forwards data 140 towards one or more data receivers 130 following one or more different data distribution schemes. According to one scheme, the data communications device 120 generates different tokens 170 for each different data receiver 130 receiving the data 140. Use of this scheme provides the ingredients for auditing data 140 on a per individual data receiver 130 basis. This was explained briefly above in the repetition of steps 812 through 824 for each different path that a data portion 150 might need to take through a data communications device 120.

For example, assume that the data communications device 120 inserts tokens 170 into the data 140 and forwards the data 140 to 100 different data receivers 130. In this example, application of the scheme results in the data communications device 120 duplicating the data 140 for forwarding the data 140 to each of the 100 different data receivers 130. In addition, the data communications device 120 generates 100 different tokens, each of which the data communications device 120 inserts into one of the 100 duplicate data elements 150-*n* that the data communications device 120, in turn, forwards to the 100 different data receivers 130. At the data receivers 130, each different data receiver 130 receives a duplicate data element 150-*n* (e.g. data portion or data element 150-*n*) of the data 140 that contains a different token 170 for each of the different data receivers 130 receiving the duplicate data element 150-*n*. This scheme provides a mechanism for conducting detailed auditing functions on a per data receiver or data portion path basis.

According to another scheme, the data communications device 120 duplicates multiple copies of the data 140 and the tokens 170, as well. That is, either the data communications device 120 copies data elements 150 containing and including the particular token 170 or the data communications device 120 copies the token 170 and the duplicate copies of the token 170 are inserted into each of 100 duplicates of the data element 150-*n*. Then the data communications device 120 forwards the data 140 (i.e. with the duplicate tokens 170) to each of the multiple different data receivers 130 so that each data receiver 130 receives data elements 150 each with a duplicate of the same token 170.

For example, assume that data 140 including the token 170 is distributed via a network 105. As the data 140 passes through a data communications device 120 somewhere along the network 105 path between the data provider 110 and the data receiver or receivers 130, the data communications device 120 makes multiple copies of the token 170. Then the data communications device 120 forwards the data 140 containing the duplicated token 170 to multiple data receivers 130 such that each of the multiple data receivers 130 receives the duplicate of the token 170.

The advantage of the first alternative (i.e. of providing different tokens 170 for each data receiver 130 or path) is that the scheme provides for auditing at a per data V receiver 130 or path level of detail. However, the scheme also demands a more significant processing burden in order to generate different individual tokens than is required for duplicating tokens 170 that the data communications device 120 forwards to the data receivers 130, as provided by the second scheme. Due to the processing burden resulting from use of the first scheme, other schemes are employed, in certain cases, that reduce the processing burden of the per data receiver 130 scheme alternative at the same time as maintaining some of the detail not available from the duplicate token 170 scheme. Under this additional alternative, the data communications device 120 creates different tokens 170 for each of a fraction of the number of data receivers 130 and/or for a fraction of the number of data elements 150. As yet one additional alternative, the data communications device 120 creates different tokens 170 for each of a fraction of the number of each data element 150 and data receiver 130 pairs.

In one such example, the data communications device 120 is configured to generate different tokens 170 for every ten data elements 150 and/or for every 100 data receivers 130. Alternatively, in another example, the data communications device 120 is configured to generate different tokens 170 for every 500 or 1000 data element/receiver pairs. In such situations, providers and/or distributors negotiate and/or contract as to the token 170 generation/insertion arrangements employed.

As described herein, in one configuration, multiple data receivers 120 insert tokens 170 into data 140 at multiple data communications device 120 locations (i.e. downstream from one another) in the network 105 path of the data 140 between the data provider 110 and data receiver or receivers 110. Accordingly, in that case, the data portions 150 traveling through the network 105 and/or upon reaching their destination data receivers 130 each contain the multiple different tokens 170 representing different data communications devices 120 through which the data 140 has passed. In an example of such a situation, the data element 150-$n$ reaches the data receiver 120 with tokens 170, for example, T1, T3, T9 and T17. Each token 170 represents a different data communications device 120 through which the data element 150-$n$ had passed on the network 105 path between the data provider 110 and the data receiver 120.

It is possible, in such a situation, that one or more of the data communications devices 120 along the network 105 path inserts different tokens 170 for a fraction of each of the data elements 120 and/or data receiver and/or data element 120 data receiver pairs, as described above. In such a situation, certain network protocols (e.g. IGMP v3, multicast protocols, etc.) provide a method for use in counting and reporting the number of different tokens 170 that the data communications device 120 generates (e.g. for each of the fraction of different data elements 150). Alternatively, the protocol reports the actual number of data elements 150 that the data communications device 120 transmits along the network 105 path.

Finally, although there is a possibility of verifying, logging and comparing (i.e. auditing) all tokens 170 traveling through all data communications devices 120 (i.e. intermediate destination points) and/or to all destination data receivers 130, such complete auditing is only one possibility. In other circumstances, it is possible to verify, log and compare smaller subsets of data 140 and tokens 170. For example, in one arrangement the method provides for verification, logging and comparison of only the data 140 and tokens 170 for a particular data receiver 130, or for a particular set of data receivers 130, or for a set of data elements 150 traveling through one or more data communications devices 120, or other combinations.

In yet another alternative embodiment, token information may be based on the geographical location of a particular data communications device 120. As such, when a particular data portion 150 reaches its final destination, an examination of the tokens inserted therein can reveal a path through the network 105 that the data portion 150 took to arrive at its destination.

What is claimed is:

1. In a data communications device, a method for providing data distribution that supports auditing, the method comprising the steps of:
   receiving data from a data provider, the data containing label information;
   filtering the data based on the label information contained in the data, wherein filtering comprises:
      retrieving a set of filter criteria associated with the data communications device;
      detecting a label of the set of filter criteria within the label information contained in the data; and
      performing a filter operation on a data;
   associating token information with the data, the token information enabling auditing capability of transmission of the data through the data communications device; and
   transmitting the data and the token information toward a data receiver, wherein the performed filter operation causes the data to be transmitted toward a data receiver defined for the label in the set of filter criteria.

2. The method of claim 1 wherein the step of filtering further comprises the steps of:
   retrieving a set of filter criteria associated with the data communications device;
   detecting a label of the set of filter criteria within the label information contained in the data; and
   performing a filter operation on a data element associated with the label to modify the data.

3. The method of claim 2 wherein the step of performing a filter operation comprises the steps of:
   removing, from the data, a data element defined by the detected label.

4. The method of claim 1 wherein step of associating further comprises the steps of:
   in response to receiving data from the data provider, creating a token of the token information, the token associated with a data element in the data;
   obtaining a data descriptor from label information for the data element within the data, the data descriptor describing content of the data element; and
   associating the data descriptor with the token in a data distribution log of the data communications device.

5. The method of claim 4 wherein the data descriptor is a financial descriptor identifying a contractual metric that relates a charge to be determined for the token associated with the data descriptor.

6. The method of claim 4 wherein the step of creating the token further comprises the steps of:
   generating an identifier for the token, the identifier including at least one of: i) a random identifier; ii) an identity of the data communications device; and iii) an identity of the data element to which the token will be associated; and
   assigning the identifier to the token.

7. The method of claim 4 further comprising the step of:
   inserting the token into the data element at a location defined by a token insertion label.

8. The method of claim 1 wherein the data includes a plurality of data elements, each delineated in the data with label information, and wherein the method comprises the steps of:
   repeating the steps of creating a token of the token information, obtaining the data descriptor, associating the data descriptor with the token in a data distribution log of the data communications device and inserting the token into the data element, for each data element in the data that includes a token insertion label, such that each data element containing the token insertion label identifies the token within the data element.

9. The method of claim 1 wherein the data is received and transmitted in the steps of receiving and transmitting using a predefined packet size, and wherein the steps of filtering and associating do not change the size of the data and wherein the step of transmitting comprises the step of recalculating connection information including a check sum.

10. The method of claim 9 wherein the data includes token insertion filler information and wherein step of inserting the token into the data element replaces a portion of token insertion filler information with token information such that the total predetermined size of the combination of the token and token insertion filler information remains constant.

11. The method of claim 1 wherein the steps of filtering and associating modifies the data to be a different size than the data received in the step of receiving and wherein the step of transmitting comprises the step of adjusting connection information associated with transmission of a data to account for changes in size of the data.

12. The method of claim 1 wherein the step of transmitting the data further comprises the steps of:
   creating a signature for the data communications device;
   associating the signature for the data communications device with the token information, the signature for the data communications device providing a means for token validation; and
   forwarding the signature for the data communications device with the data and token information.

13. The method of claim 1 wherein label information is arranged in a hierarchical manner having a number of different label levels and wherein step of filtering data comprises the step of filtering the data based on label information contained in the data at a predetermined number of label levels in hierarchy of labeling information.

14. A data communications device for providing data distribution that supports auditing, the data communications device comprising:
   a communications interface;
   a memory;
   a processor; and
   an interconnection mechanism coupling the communications interface, the memory and the processor;
   wherein the memory is configured with a data distribution application, that when executed on the processor supports auditing by performing the steps of:
   receiving data from a data provider, the data containing label information;
   filtering the data based on the label information contained in the data, wherein filtering comprises:
      retrieving a set of filter criteria associated with the data communications device;
      detecting a label of the set of filter criteria within the label information contained in the data; and
      performing a filter operation on a data;
   associating token information with the data, the token information enabling auditing capability of transmission of the data through the data communications device; and
   transmitting the data and the token information toward a data receiver, wherein the performed filter operation causes the data to be transmitted toward a data receiver defined for the label in the set of filter criteria.

15. The data communications device of claim 14 wherein, when the data communications device performs the step of filtering, the data communications device performs the operations of:
   retrieving a set of filter criteria associated with the data communications device;
   detecting a label of the set of filter criteria within the label information contained in the data; and
   performing a filter operation on a data element associated with the label to modify the data.

16. The data communications device of claim 15 wherein the filter operation comprises the steps of removing, from the data, a data element defined by the detected label.

17. The data communications device of claim 14 wherein, when the data communications device performs the step of associating, the data communications device performs the operations of:
   in response to receiving data from the data provider, creating a token of the token information, the token associated with a data element in the data;
   obtaining a data descriptor from label information for the data element within the data, the data descriptor describing content of the data element; and
   associating the data descriptor with the token in a data distribution log of the data communications device.

18. The data communications device of claim 17 wherein the data descriptor is a financial descriptor identifying a contractual metric that relates a charge to be determined for the token associated with the data descriptor.

19. The data communications device of claim 17 wherein, when the data communications device performs the step of creating the token, the data communications device performs the operations of:
   generating an identifier for the token, the identifier including at least one of: i) a random identifier; ii) an identity of the data communications device; and iii) an identity of the data element to which the token will be associated; and
   assigning the identifier to the token.

20. The data communications device of claim 17, wherein the data communications device further performs the operation of:
   inserting the token into the data element at a location defined by a token insertion label.

21. The data communications device of claim 14, wherein the data includes a plurality of data elements, each delineated in the data with label information, and wherein the data communications device performs the operations of:
   repeating the steps of creating a token of the token information, obtaining the data descriptor, associating the data descriptor with the token in a data distribution log of the data communications device and inserting the token into the data element, for each data element in the data that includes a token insertion label, such that each data element containing the token insertion label identifies the token within the data element.

22. The data communications device of claim 14 wherein the data is received and transmitted in the steps of receiving and transmitting using a predefined packet size, and wherein the steps of filtering and associating do not change the size of the data and wherein, when the data communications device performs the step of transmitting the data communications device performs the operations of recalculating connection information including a check sum.

23. The data communications device of claim 14 wherein the steps of filtering and associating modifies the data to be a different size than the data received in the step of receiving and wherein, when the data communications device performs the step of transmitting the data communications device performs the operation of adjusting connection information associated with transmission of a data to account for changes in size of the data.

24. The data communications device of claim 20 wherein the data includes token insertion filler information and wherein when the data communications device performs the step of inserting the token into the data element, the data communications device replaces a portion of token insertion filler information with token information such that the total predetermined size of the combination of the token and token insertion filler information remains constant.

25. The data communications device of claim 14 wherein, when the data communications device performs the step of transmitting the data, the data communications device performs the operation of:
   creating a signature for the data communications device;
   associating the signature for the data communications device with the token information, the signature for the data communications device providing a means for token validation; and
   forwarding the signature for the data communications device with the data and token information.

26. The data communications device of claim 14 wherein label information is arranged in a hierarchical manner having a number of different label levels and wherein, when the data communications device performs the step of filtering data, the data communications device performs the operation of filtering the data based on label information contained in the data at a predetermined number of label levels in hierarchy of labeling information.

27. A data communications device, for providing data distribution that supports auditing, comprising:
   a memory;
   a communications interface;
   a processor;
   an interconnection mechanism coupling the memory, the processor and the communications interface;
   means, coupled to the communications interface, for receiving data from a data provider, the data containing label information;
   means, coupled to the processor, for filtering the data based on the label information contained in the data, wherein means for filtering comprises:
      means for retrieving a set of filter criteria associated with the data communications device;
      means for detecting a label of the set of filter criteria within the label information contained in the data; and
      means for performing a filter operation on a data;
   means, coupled to the processor, for associating token information with the data, the token information enabling auditing capability of transmission of the data through the data communications device; and
   means, coupled to the communications interface, for transmitting the data and the token information toward a data receiver, wherein the performed filter operation causes the data to be transmitted toward a data receiver defined for the label in the set of filter criteria.

28. A computer program product that includes a computer readable storage medium having instructions stored thereon for providing information suitable for providing data distribution that supports auditing, the method comprising the steps of:
   receiving data from a data provider, the data containing label information;
   filtering the data based on the label information contained in the data, wherein filtering comprises:
   retrieving a set of filter criteria associated with the data communications device;
   detecting a label of the set of filter criteria within the label information contained in the data; and
   performing a filter operation on a data;
   associating token information with the data, the token information enabling auditing capability of transmission of the data through the data communications device; and
   transmitting the data and the token information toward a data receiver, wherein the performed filter operation causes the data to be transmitted toward a data receiver defined for the label in the set of filter criteria.

29. The method of claim 4 comprising:
   tracking the data received by the data receiver through use of the token information associated with the data; and
   comparing the token in the data distribution log of the data communications device with the token information of the tracked data to audit the data provider.

30. The data communications device of claim 17 wherein the data communications device performs the operations of:
   tracking the data received by the data receiver through use of the token information associated with the data; and
   comparing the token in the data distribution log of the data communications device with the token information of the tracked data to audit the data provider.

31. The data communications device of claim 27 comprising:
   in response to receiving data from the data provider, means, coupled to the processor, for creating a token of the token information, the token associated with a data element in the data;
   means, coupled to the processor, for obtaining a data descriptor from label information for the data element within the data, the data descriptor describing content of the data element;
   means, coupled to the processor, for associating the data descriptor with the token in a data distribution log of the data communications device;
   means, coupled to the communication interface, for tracking the data received by the data receiver through use of the token information associated with the data; and
   means, coupled to the processor, for comparing the token in the data distribution log of the data communications device with the token information of the tracked data to audit the data provider.

32. The computer program product of claim 28 comprising:
   in response to receiving data from the data provider, creating a token of the token information, the token associated with a data element in the data;
   obtaining a data descriptor from label information for the data element within the data, the data descriptor describing content of the data element;
   associating the data descriptor with the token in a data distribution log of the data communications device;
   tracking the data received by the data receiver through use of the token information associated with the data; and
   comparing the token in the data distribution log of the data communications device with the token information of the tracked data to audit the data provider.

* * * * *